(12) United States Patent
Tabaczynski

(10) Patent No.: US 8,305,092 B2
(45) Date of Patent: Nov. 6, 2012

(54) CAPACITIVE SENSING SYSTEM AND METHOD

(75) Inventor: Michael Tabaczynski, Northville, MI (US)

(73) Assignee: TK Holdings Inc., Auburn Hills, MI (US)

(*) Notice: Subject to any disclaimer, the term of this patent is extended or adjusted under 35 U.S.C. 154(b) by 603 days.

(21) Appl. No.: 12/541,829

(22) Filed: Aug. 14, 2009

(65) Prior Publication Data

US 2010/0039123 A1 Feb. 18, 2010

Related U.S. Application Data

(60) Provisional application No. 61/136,178, filed on Aug. 15, 2008.

(51) Int. Cl.
*G01R 27/26* (2006.01)
(52) U.S. Cl. ........................ 324/686; 324/658
(58) Field of Classification Search ............... 324/686, 324/658, 649, 600
See application file for complete search history.

(56) References Cited

U.S. PATENT DOCUMENTS

| | | | |
|---|---|---|---|
| 5,722,686 A * | 3/1998 | Blackburn et al. | 280/735 |
| 7,500,536 B2 | 3/2009 | Bulgajewski et al. | |
| 2006/0164254 A1 * | 7/2006 | Kamizono et al. | 340/667 |
| 2006/0187038 A1 | 8/2006 | Shieh et al. | |
| 2008/0100425 A1 | 5/2008 | Kiribayashi | |
| 2009/0069985 A1 * | 3/2009 | Sakai et al. | 701/49 |
| 2010/0327638 A1 * | 12/2010 | Petereit et al. | 297/180.12 |

OTHER PUBLICATIONS

US Notice of Allowance in U.S. Appl No. 12/541,825 dated Dec. 14, 2011.
Office Action in U.S. Appl. No. 12/541,826 dated Apr. 25, 2012.

* cited by examiner

*Primary Examiner* — Hoai-An D Nguyen
(74) *Attorney, Agent, or Firm* — Foley & Lardner LLP

(57) ABSTRACT

A capacitive sensing system includes a conductive sensing element and a circuit configured to provide measurements related to a sensing current sent to the sensing element. The circuit is located remote from the sensing element. The system also includes a switch configured to selectively couple the sensing element to the circuit. The switch is located proximate to the sensing element. The system also includes an electrical conductor that electrically couples the switch and the circuit. The conductor carries sensing signals from the circuit to the sensing element when the switch is closed.

19 Claims, 4 Drawing Sheets

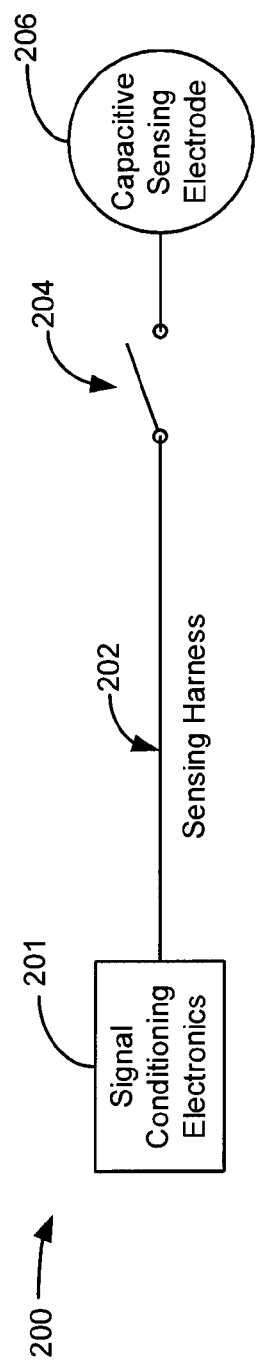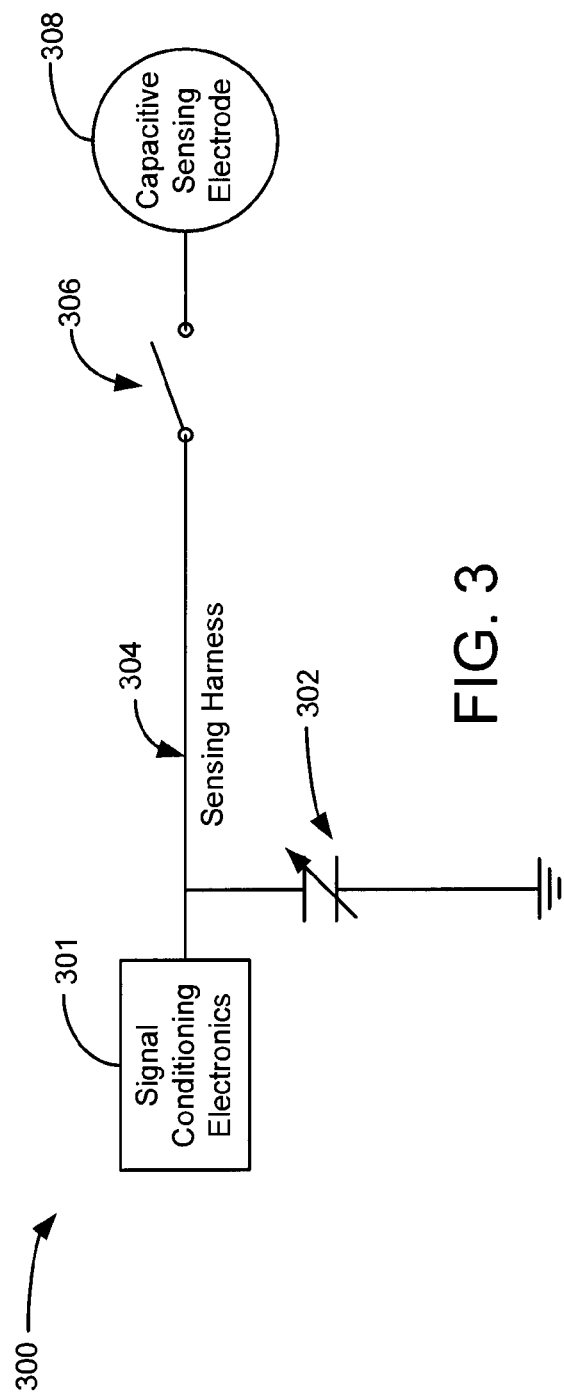

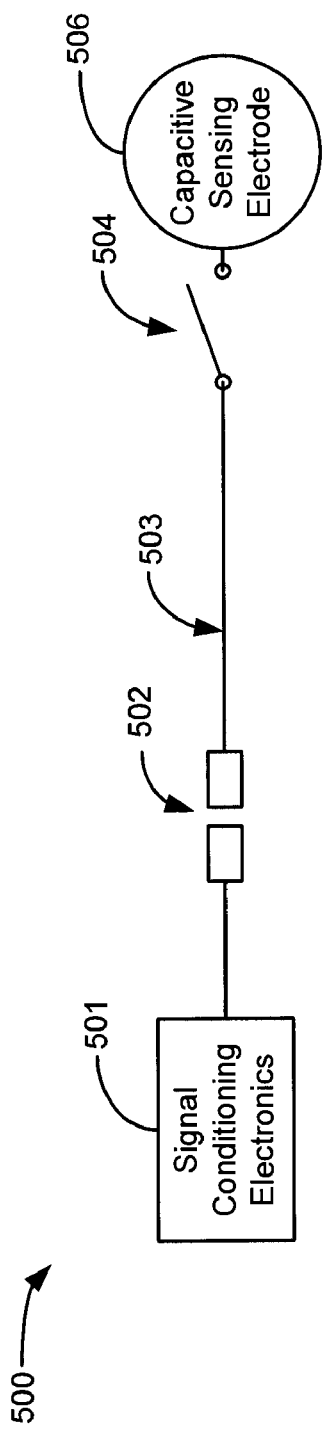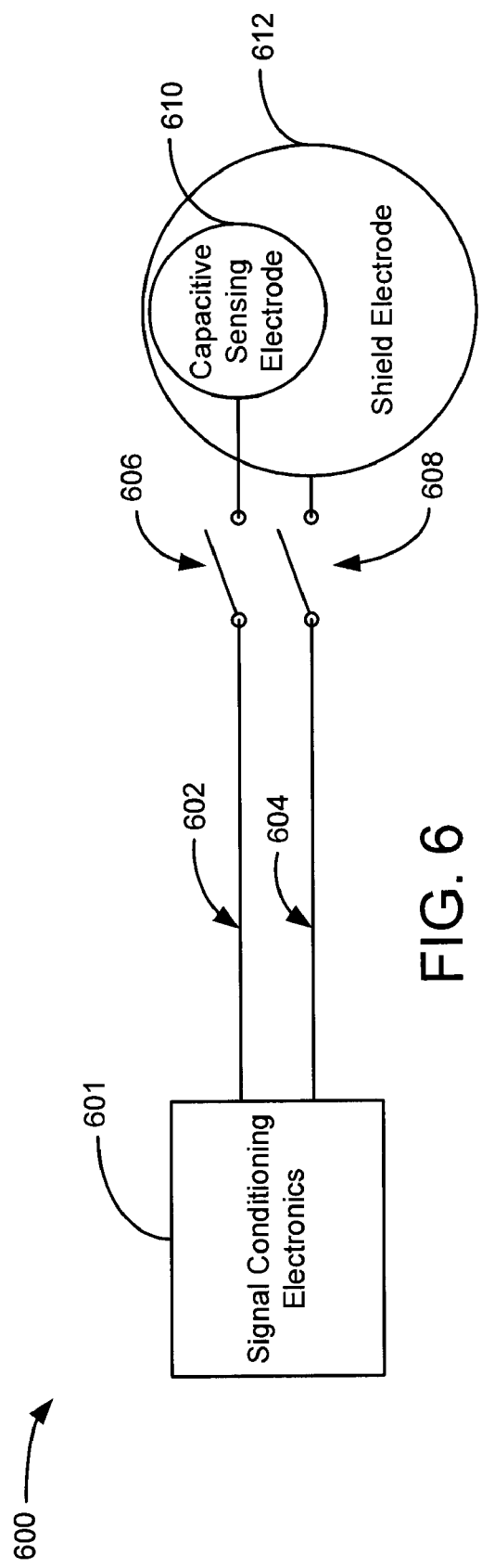

US 8,305,092 B2

CAPACITIVE SENSING SYSTEM AND METHOD

CROSS-REFERENCE TO RELATED PATENT APPLICATION

This application claims priority to and the benefit of U.S. Provisional Patent Application No. 61/136,178 filed on Aug. 15, 2008, the entirety of which is herein incorporated by reference.

BACKGROUND

The present disclosure relates generally to the field of capacitive sensors and sensing methods. More specifically, the disclosure relates to capacitive sensors and sensing methods for occupants of a vehicle seat.

SUMMARY

One disclosed embodiment relates to a capacitive sensing system for a vehicle. The system includes a capacitive sensing element and a circuit configured to provide measurements related to an occupant of the vehicle based on a signal received from the capacitive sensing element. The circuit is located remote from the capacitive sensing element. The system also includes a switch configured to selectively couple the capacitive sensing element to the circuit. The switch is located proximate to the capacitive sensing element. The system also includes a harness configured to carry an electrical conductor that electrically couples the switch and the circuit. The conductor carries sensing signals from the circuit to the capacitive sensing element when the switch is closed.

Another disclosed embodiment relates to a capacitive sensing system including a conductive sensing element and a circuit configured to provide measurements related to a sensing current sent to the sensing element. The circuit is located remote from the sensing element. The system also includes a switch configured to selectively couple the sensing element to the circuit. The switch is located proximate to the sensing element. The system also includes an electrical conductor that electrically couples the switch and the circuit. The conductor carries sensing signals from the circuit to the sensing element when the switch is closed.

Another disclosed embodiment relates to a method for measuring a change in capacitance at a vehicle sensor. The method includes the steps of closing a switch located proximate to the capacitive sensing element using a control signal from a circuit, transmitting a signal from the capacitive sensing element to the circuit over a conductor in a harness, generating an electric field at a capacitive sensing element, and providing a calculation or measurement based on the signal using the circuit.

It is to be understood that both the foregoing general description and the following detailed description are exemplary and explanatory only, and are not restrictive of the invention as claimed.

BRIEF DESCRIPTION OF THE DRAWINGS

The disclosure will become more fully understood from the following detailed description, taken in conjunction with the accompanying drawings.

FIG. 2 is a schematic diagram of a sensing system, according to an exemplary embodiment.

FIG. 3 is a schematic diagram of a sensing system, according to a further exemplary embodiment.

FIG. 5 is a schematic diagram of a sensing system, according to a yet further exemplary embodiment.

FIG. 6 is a schematic diagram of a shielded sensing system, according to an exemplary embodiment.

DETAILED DESCRIPTION

Figure 1:
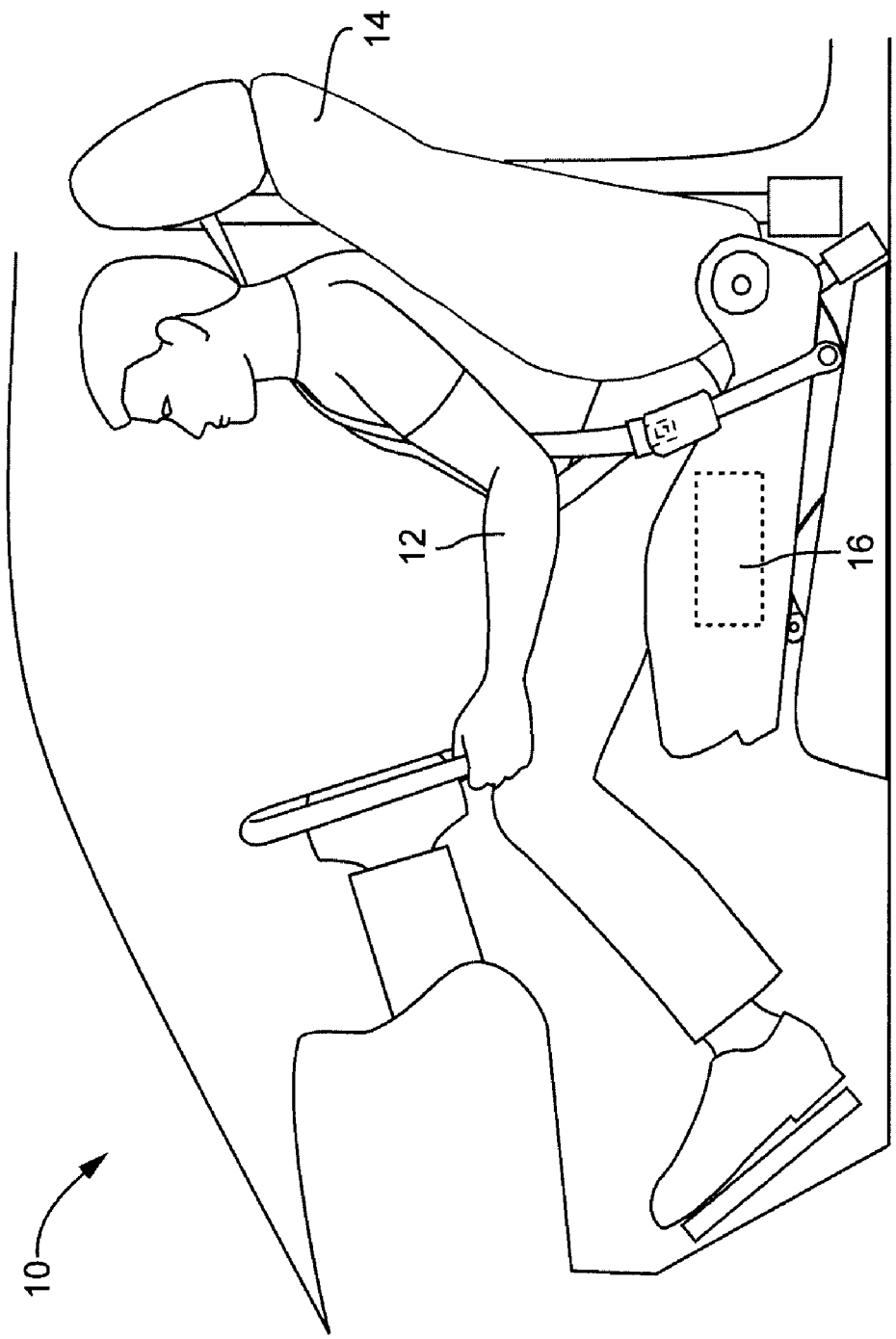
FIG. 1 is a perspective view of a vehicle seat, according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Capacitive sensors may be configured for numerous applications in a vehicle. For example, a capacitive sensor may be used in an occupant classification system, an occupant presence sensor, a head position sensor, an anti-pinch sensor, non-touch controls, etc. Conventionally, these systems include signal conditioning electronics, a sensor, and a harness connecting the sensor to the signal conditioning electronics. However, unless properly shielded, the harness acts as a sensing device in addition to the sensor. As a result, in conventional systems, the harness connecting the sensor to the signal conditioning electronics is short.

Further, the harness may act as a sensor and change orientation with an object that affects the measurement. As a result, the harness may create a measurement offset shift. One solution is to make the harness so short that the harness effectively is where the sensor should be. Another solution is to shield the harness with an electrical signal nearly identical to the sensor signal (also called a driven shield) or another consistent signal (e.g., the system's ground). A further solution is to mechanically shield the harness with a thick mechanical conduit such that there is only a small sensitivity to objects outside the conduit. Yet further, another solution is to configure the signal conditioning electronics to be small enough to be integrated very close to the sensor, for example with an application specific integrated circuit (ASIC).

However, the aforementioned solutions have limitation or significant cost implications, especially when multiple sensors are used, when the sensor must be located far from the signal conditioning electronics, and/or when in-line connections must be used to complete the sensing harness. Therefore, it is desirable to provide a capacitive sensing system wherein the harness does not create a measurement offset shift. Further, it is desirable that the method does not have significant limitations or cost implications.

Referring generally to the figures, a sensing system that reduces the effects of drift on sensing measurements is shown. The system may include a signal conditioning electronics, sensing harnesses, switches, capacitive sensing elements (e.g., capacitive sensing electrodes), capacitors, and/or in-line connectors. A circuit of the system may make measurements based on signals from the capacitive sensing elements. The switches may be used to couple the capacitive sensing elements and the circuit, and a harness may electrically couple the switch and the circuit and transmit sensing signals from the capacitive sensing element to the circuit.

Referring to FIG. 1, a vehicle 10 is shown with an occupant 12 in a seat 14 of the vehicle 10, according to an exemplary embodiment. The seat 14 may include an occupant sensing system 16. As shown in FIG. 1, the occupant sensing system 16 may generally be located in the seat 14 below the area in which an occupant 12 of the vehicle 10 sits, or may be located in other areas of the seat 14 or vehicle 10.

The occupant sensing system 16 may generally include a sensor and sensing system for sensing occupancy of the seat 14. For example, the sensor may determine the weight of the occupant in the seat 14 to determine occupancy characteristics. The occupant sensing system 16 may further include a seat heating system and/or other systems for the seat 14 of the vehicle 10.

According to an exemplary embodiment, the occupant sensing system 16 includes a capacitive sensor. The capacitive sensor may generally be capable of sensing properties such as a proximity, position, or weight of an object, or the like. The capacitive sensor may sense based on measuring a change in capacitance (e.g., changes in an electrical property between two conductive objects); the capacitive sensor generally consisting of a conductive object within the occupant sensing system 16 and an object such as an occupant 12. Referring to the present disclosure, the capacitive sensor may be used as an occupancy sensor to detect the presence of an occupant 12 in the seat 14 the occupant sensing system 16 is associated with. As an occupant 12 sits on seat 14, the capacitance change may be used to determine the presence of the occupant 12 by the occupant sensing system 16 or other occupant 12 properties (e.g., weight of the occupant 12).

Referring to FIG. 2, a schematic diagram of a sensing system is shown, according to an exemplary embodiment. The sensing system 200 includes signal conditioning electronics 201, a sensing harness 202, a switch 204, and capacitive sensing electrodes 206.

The signal conditioning electronics 201 may be any hardware or software configuration capable of executing instructions and operating on signals sent to the sensor. For example, in a vehicle, the signal conditioning electronics 201 may determine the environment above a seat cover. More specifically, the signal conditioning electronics 201 may determine the size, presence, position, etc. of an occupant based upon signals received from a sensor.

The sensing harness 202 may be any conductive material configured to relay signals between the signal conditioning electronics 201, switch 204, and capacitive sensing electrode 206. Further, the sensing harness 202 may vary in length depending upon the application. Additionally, the sensing harness 202 may be shielded electrically, mechanically, or with any other known shielding method.

The switch 204 may be a remote switch used to connect or disconnect the signal conditioning electronics 201 from the capacitive sensing electrode 206. The switch 204 may be any switch capable of connecting or disconnecting the signal conditioning electronics 201 from the capacitive sensing electrode 206. For example, the switch 204 may be a relay contact, field-effect transistor (FET) switch, other electronic switch, etc. Further, the switch 204 preferably has a low impedance (at the sensing frequency) when closed, and a very high impedance (at the sensing frequency) when open. According to one exemplary embodiment, the switch 204 may be integrated with the capacitive sensing electrodes 206.

The capacitive sensing electrode 206 may be any capacitive element capable of detecting environmental changes. For example, the capacitive sensing electrode 206 may consist of a flexible plate capacitive sensor configured to detect changes in the environment above the seat cover of a vehicle seat.

The sensing system 200 may be configured to open or close the switch 204 while the signal conditioning electronics 201 measures signals received via the sensing harness 202 and/or capacitive sensing electrode 206. Therefore, the signal conditioning electronics 201 may take measurements with the sensing electrode 206 connected and without the sensing electrode 206 connected. The signal conditioning electronics 201 may calculate the difference between the signal with the sensing electrode 206 connected and without the sensing electrode 206 connected. Thus, the signal conditioning electronics 201 may obtain the effective sensor measurements by eliminating the contribution of the harness to the measurement, which may be constant if the measurements are performed in a short period of time.

Referring to FIG. 3, a sensing system is shown according to a further exemplary embodiment. The sensing system 300 includes signal conditioning electronics 301, a variable capacitor 302, a sensing harness 304, a switch 306 and a capacitive sensing electrode 308.

The sensing harness 304 may have a varying capacitance to ground 302. However, the short term variation caused by the harness 304 and the capacitor 302 may be eliminated when the difference between when the switch 306 is open and when the switch 306 is closed is calculated. Thus, the signal conditioning electronics 301 may still make a repeatable measurement of the capacitive sensing electrode 308. Further, changes in the variable capacitor 302 may be measured by the signal conditioning electronics 301 when the switch 306 is open.

Figure 4:
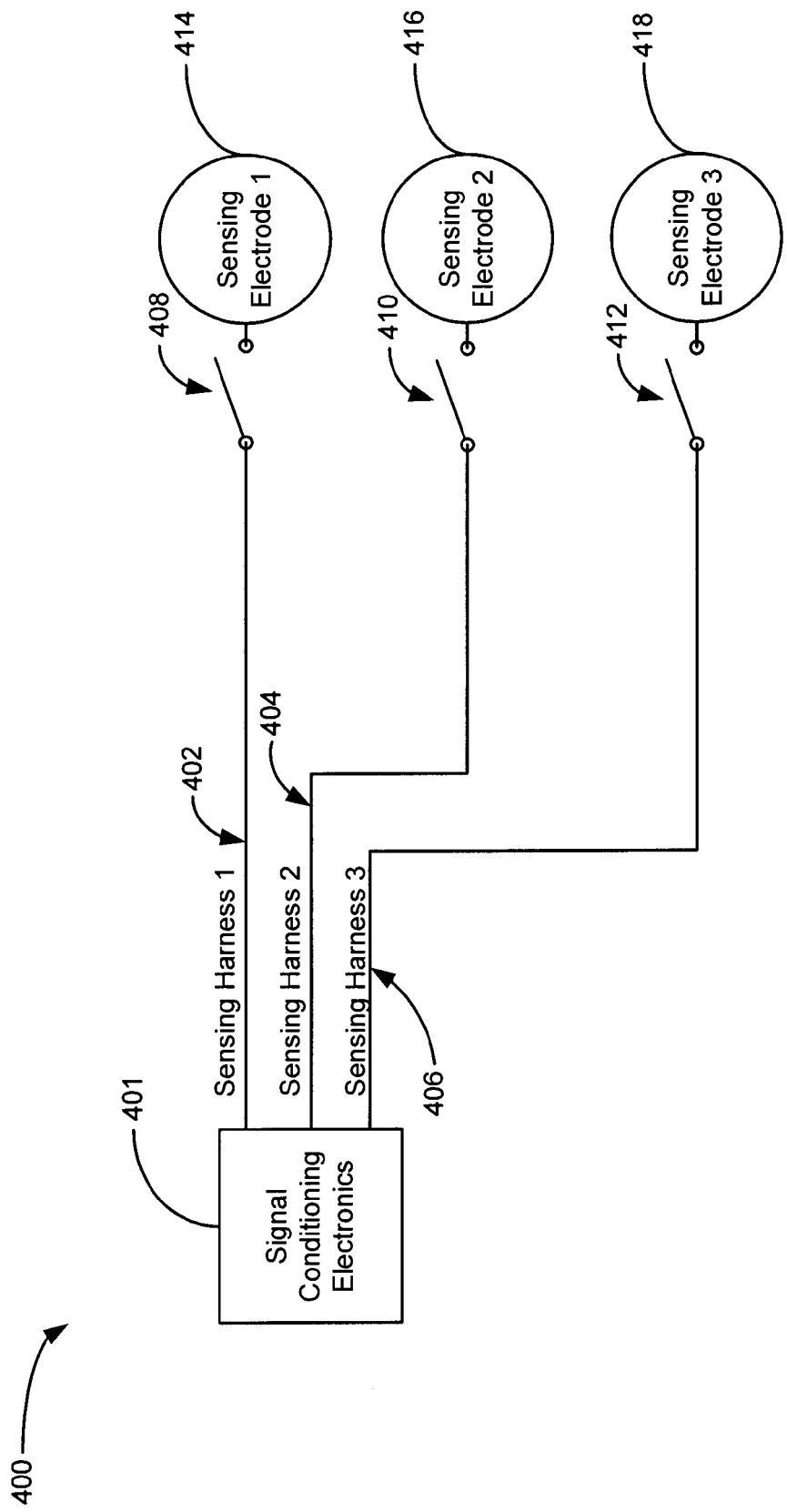
FIG. 4 is a schematic diagram of a sensing system, according to a yet further exemplary embodiment.

Referring to FIG. 4, a sensing system is shown according to a yet further exemplary embodiment. The sensing system 400 includes signal conditioning electronics 401, a first sensing harness 402, a second sensing harness 404, and a third sensing harness 406. The sensing system 400 additionally includes a first switch 408, second switch 410, and third switch 412. The sensing system 400 further includes a first sensing electrode 414, second sensing electrode 416, and third sensing electrode 418.

According to an exemplary embodiment, each sensing electrode 414, 416, 418 of the sensing system 400 includes a switch 408, 410, 412. Further, the location of the switch 408, 410, or 412 is local to or located in proximity to the sensor 414, 416, or 418. Additionally, multiple sensors could be used, wherein each sensor includes a switch that is located in proximity to the sensor. Each harness 402, 404, and 406 are configured to electrically couple the switches 408, 410, and 412 to its corresponding sensor 414, 416, and 418.

Referring to FIG. 5, a schematic diagram of a sensing system is shown, according to a yet further exemplary embodiment. The sensing system 500 includes signal conditioning electronics 501, an in-line connector 502, a sensing harness 503, a switch 504, and a capacitive sensing electrode 506.

According to an exemplary embodiment, the sensing harness 503 includes an in-line connector 502. The in-line connector 502 may also be an integrated connector. The integrated connector may be located at the signal conditioning electronics 501 or at the switch 504 and may be configured for coupling to the sensing harness 503. Further, the location of the switch 504 is located in proximity to the capacitive sensing electrode 506.

Referring to FIG. 6, a schematic diagram of a shielded sensing system is shown, according to an exemplary embodiment. The sensing system 600 includes signal conditioning electronics 601, sensing harness 602, shielding harness 604, sensing switch 606, and shielding switch 608. The sensing system 600 additionally includes a capacitive sensing electrode 610 and a shield electrode 612.

According to an exemplary embodiment, some applications may use a shield electrode 612 near the capacitive sensing electrode 610 to prevent detection of objects on a side of the shield opposite of the electrode 612. For example, the shield electrode 612 may be in another plane than sensing electrode 610, in different orientation than sensing electrode 610, around sensing electrode 610, etc. The sensing system 600 may use the shield electrode 612 by opening or closing the sensing switch 606, the shielding switch 608, or both. According to various exemplary embodiments, the sensing system 600 may include additional shield electrodes with additional switches to couple the shield electrodes to the electronics 601 and additional harnesses configured to couple the switches and the electronics 601.

Further, the sensing switch 606 and the shielding switch 608 may be controlled such that they switch at appropriate times, thereby allowing the signal conditioning electronics 601 to take accurate measurements. To control the switching, the sensing system 600 could include control lines in parallel with the sensing harness 602 and the shielding harness 604. Additionally, any other necessary signals, such as power lines to provide power to the switches 606 and 608 and ground lines to ground the switches 606 and 608, may also be sent to the sensing switch 606 and shielding switch 608 along the sensing harness 602 and/or shielding harness 604. The control lines, power lines, and/or ground lines may be parallel to the harnesses 602 and 604 and electrically couple the switches 606 and 608 to the electronics 601.

Additionally, it should be appreciated that other multi-measurement techniques that are used to eliminate other sources of system drift may be used with any of the embodiments shown in FIGS. 2 through 6. As a result, overall system measurement stability may be further improved.

The present disclosure has been described with reference to exemplary embodiments, however workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter. It is also noted that the disclosed methods may be performed in any of a variety or sequence of steps and may include more or fewer steps than illustrated.

What is claimed is:

1. A capacitive sensing system for a vehicle, comprising:
    a capacitive sensing element;
    a circuit configured to provide measurements related to an occupant of the vehicle based on a sensing current sent to the capacitive sensing element, the circuit located remote from the capacitive sensing element;
    a switch configured to selectively couple the capacitive sensing element to the circuit, the switch being located proximate to the capacitive sensing element;
    a harness configured to carry an electrical conductor that electrically couples the switch and the circuit and wherein the electrical conductor carries a first sensing signal from the circuit to the capacitive sensing element when the switch is closed and a second sensing signal from the circuit when the switch is open; and
    electronics configured to receive measurements of the first and second sensing signals and to calculate a difference between the first and second sensing signals.

2. The capacitive sensing system of claim 1, wherein the electrical conductor has a variable capacitance to ground, the variable capacitance being the same whether the switch is open or closed.

3. The capacitive sensing system of claim 1, further comprising:
    at least one additional capacitive sensing element;
    at least one additional switch, each of the at least one additional switches configured to selectively couple one of the at least one additional capacitive sensing elements and the circuit, each the at least one additional switches being located proximate to the respective at least one additional capacitive sensing element; and
    at least one additional harness, each of the at least one additional harnesses configured to carry an additional electrical conductor that electrically couples one of the at least one additional switch to the circuit and wherein the additional conductor transmits a third sensing signal to the circuit.

4. The capacitive sensing system of claim 1, wherein the harness comprises an in-line connector, and wherein the circuit or the switch comprises an integrated connector for coupling to the harness.

5. The capacitive sensing system of claim 1, wherein the switch is integrated into the capacitive sensing element.

6. The capacitive sensing system of claim 1, further comprising:
    a shield electrode.

7. The capacitive sensing system of claim 6, further comprising:
    a second switch configured to selectively couple the shield electrode to the circuit, the switch being located proximate to the shield electrode; and
    a second electrical conductor configured to electrically couple the second switch to the circuit.

8. The capacitive sensing system of claim 1, further comprising a control line for the circuit to control the switching of the switch, wherein the control line electrically couples the switch to the circuit.

9. The capacitive sensing system of claim 1, wherein the switch comprises a relay contact or an electronic switch.

10. The capacitive sensing system of claim 1, wherein the capacitive sensing system comprises at least one of an occupant classification system, an occupant sensing system, a head position sensing system, an anti-pinch sensing system, and a hands-free control system.

11. A capacitive sensing system, comprising:
- a conductive sensing element;
- a circuit configured to provide measurements related to a sensing current sent to the conductive sensing element, the circuit located remote from the conductive sensing element;
- a switch configured to selectively couple the conductive sensing element to the circuit, the switch being located proximate to the conductive sensing element;
- an electrical conductor that electrically couples the switch and the circuit and wherein the electrical conductor carries a first sensing signal from the circuit to the conductive sensing element when the switch is closed and a second sensing signal from the circuit when the switch is open; and
- electronics configured to receive measurements of the first and second sensing signals and to calculate a difference between the first and second sensing signals.

12. The capacitive sensing system of claim 11, wherein the sensing system is used to sense part of a body of an occupant of a vehicle or to classify an occupant of a seat.

13. The capacitive sensing system of claim 11, wherein the result of the sensor measurement influences the deployment of a safety device.

14. The capacitive sensing system of claim 11, further comprising:
- at least one additional conductive sensing element;
- at least one additional switch, each of the at least one additional switches configured to selectively couple one of the at least one additional conductive sensing element and the circuit, each of the at least one additional switches being located proximate to the respective at least one additional conductive sensing element; and
- at least one additional electrical conductor, each of the at least one additional electrical conductor configured to electrically couple one of the at least one additional switch to the circuit and wherein the additional conductor transmits a third sensing signal representing capacitance to the circuit.

15. The capacitive sensing system of claim 11, wherein the electrical conductor comprises an in-line connector, and wherein the circuit or the switch comprises an integrated connector for coupling to the electrical conductor.

16. The capacitive sensing system of claim 11, further comprising:
- a shield electrode.

17. The capacitive sensing system of claim 16, further comprising:
- a second switch configured to selectively couple the shield electrode and the circuit, the switch being located proximate to the shield electrode; and
- a second electrical conductor configured to electrically couple the second switch and the circuit.

18. A method for measuring a change in capacitance at a vehicle sensor, comprising the steps of:
- closing a switch located proximate to the capacitive sensing element using a control signal from a circuit;
- transmitting a first signal from the circuit to the capacitive sensing element over a conductor in a harness when the switch is closed;
- generating an electric field at a capacitive sensing element;
- providing a measurement based on the first signal using the circuit;
- measuring a capacitance between the harness and ground when the switch is open using the circuit to determine a second signal; and
- calculating a difference between the first signal and the second signal using the circuit.

19. The method of claim 18, wherein multiple capacitive sensing elements are used, each of the multiple capacitive sensing elements being coupled to the circuit via an additional switch and a conductor of an additional harness, the circuit selectively measuring a capacitance at one or more of the multiple capacitive sensing elements.

* * * * *